United States Patent [19]  [11]  4,044,039
DeVries  [45]  Aug. 23, 1977

[54] HCN-OLEFIN ADDUCT USING HF

[75] Inventor: Louis DeVries, Green Brae, Calif.

[73] Assignee: Chevron Research Company, San Francisco, Calif.

[21] Appl. No.: 306,118

[22] Filed: Nov. 13, 1972

Related U.S. Application Data

[63] Continuation-in-part of Ser. No. 884,752, Dec. 12, 1969, abandoned.

[51] Int. Cl.$^2$ ............................................. C07C 119/18
[52] U.S. Cl. ........................ 260/453 RW; 260/268 R; 260/564 R; 260/564 RF; 260/585 R
[58] Field of Search ........................ 260/404, 453 RW

[56]  References Cited
U.S. PATENT DOCUMENTS

| 3,318,681 | 5/1967 | Yates | 260/453 R |
|---|---|---|---|
| 3,338,967 | 8/1967 | Potts et al. | 260/404 |
| 3,374,260 | 3/1968 | Buchanan | 260/453 R |
| 3,402,193 | 9/1968 | Hagemeyer, Jr. et al. | 260/453 R |
| 3,488,355 | 1/1970 | Levy | 260/453 R |
| 3,530,153 | 9/1970 | Potts et al. | 260/404 |
| 3,580,943 | 5/1971 | Trepanier | 260/453 R |
| 3,594,398 | 7/1971 | Saegusa et al. | 260/453 R |
| 3,649,664 | 3/1972 | Richter et al. | 260/453 R |

FOREIGN PATENT DOCUMENTS 2,061,057  6/1971  Germany .................... 260/453 R

OTHER PUBLICATIONS

Krimen et al., "The Ritter Reaction," (1969), Org. Reactions, pp. 213 & 266, (1969).
Ritter et al., "A New Reaction of Nitriles etc;" (1948), J.A.C.S. 70, pp. 4045-4050, (1948).

*Primary Examiner*—Glennon H. Hollrah
*Attorney, Agent, or Firm*—C. J. Tonkin; L. L. Priest

[57]  ABSTRACT

A process for the preparation of N-hydrocarbyl- substituted primary amines in the form of N-hydrocarbyl formimidate ester by the alkylation of hydrocyanic acid. The process comprises contacting a nonconjugated olefin with hydrocyanic acid and hydrogen fluoride in the presence of an alcohol or mercaptan.

8 Claims, No Drawings

4,044,039

HCN-OLEFIN ADDUCT USING HF

CROSS-REFERENCES

This is a continuation-in-part of co-pending application Ser. No. 884,752, filed Dec. 12, 1969 now abandoned.

BACKGROUND OF THE INVENTION

1. Field of the Invention

The field of organic chemistry is continuously evolving new methods for introducing functionalities into hydrocarbons. Because of the wide range of utilities possessed by amines and their derivatives alternative routes for introducing amine functionalities are always desirable.

2. Description of the Prior Art

The use of hydrocyanic acid with alcohols or olefins has been reported in the literature, frequently under the title of the Ritter reaction. For a review, see *Zila's Berman,* Russ Chem. Rev. 29, 331–344 (1960).

Potts et al, U.S. Pat. Nos. 3,338,967 and 3,530,153, describe a process for the preparation of secondary-alkyl primary amines by the reaction of an olefin with hydrocyanic acid and water in a hydrogen fluoride medium. This process yields a formamide intermediate rather than an N-hydrocarbyl formimidate ester. U.S. Pat. Nos. 3,402,193, 3,374,260, and 3,580,943 describe the reaction of alcohols or mercaptans with HCl or HBr and a nitrile (Pinner synthesis) which proceeds via the protonation of nitrile rather than the alkylation of HCN and yields imidates other than formimidate esters. The Pinner synthesis can only produce N-unsubstituted imidates. N-substituted imidates are produced from imidoyl derivatives by alcoholysis or reaction with sodium alkoxide, or by alkylation of imides or thionamides by alkyl halides, sulfates or oxonium salts. See P. A. S. Smith, Open-Chain Nitrogen Compounds, Vols. I and II, W. A. Benjamin, New York.

SUMMARY

A process for the preparation of N-hydrocarbyl-substituted primary amines by the alkylation of hydrocyanic acid and the formation of N-hydrocarbyl formimidate ester. The process comprises contacting a nonconjugated olefin with hydrocyanic acid and hydrogen fluoride in the presence of an alcohol or mercaptan. The product can be used directly or subjected to solvolysis.

DESCRIPTION OF THE PREFERRED EMBODIMENTS

The process is carried out by combining a nonconjugated olefin, hydrocyanic acid and hydrogen fluoride in the presence of an alcohol or mercaptan under relatively mild conditions, normally in the presence of an inert solvent.

The temperature for the reaction will usually be of at least $-10°$ C, more usually at least $0°$ C and normally not exceed $100°$ C. Because of the volatile nature of the hydrocyanic acid and hydrofluoric acid, temperatures much about $25°$ C will require high pressure equipment. Therefore, whenever the reaction proceeds at a reasonable rate, at $25°$ C or below, these temperatures are preferred. As for the pressure of the reaction, the pressure will either vary from atmospheric to the autogenous pressure of the reaction mixture at the temperature employed.

The time for the reaction will vary widely, depending on the reactants, the concentration of the reactants, and the temperature of the reaction. With lower temperatures, longer times will be required. Normally, the time will be at least 0.5 hours and may range to as long as 200 hours.

The ratio of the reactants may be varied widely and is primarily one of convenience to insure major conversion of the most expensive reactant. Since in most instances, the hydrofluoric acid and hydrocyanic acid can be recovered easily, economic considerations indicate that the olefin be in the lowest mol proportion. The mol ratio of hydrocyanic acid to olefin will usually be at least 0.5–20:1, more usually 2–15:1 and preferably 3–10:1. The mol ratio of hydrofluoric acid to hydrocyanic acid will normally be at least 1 to 1 and generally not more than about 10 to 1. Usually, there will be at least about 1.5 mols of hydrofluoric acid and not more than about 5 mols per mol of hydrocyanic acid. The alcohol or mercaptan will usually be present in at least about 0.9 mols per mol of olefin reactant and usually from about 1 to 10, more usually 1 to 5, mols per mol of olefin reactant. These amounts indicate the total amount of materials combined and are not intended to indicate the concentration at any moment, which may vary depending on the method of carrying out the process.

When an inert solvent is used, the weight percent of olefin reactant may be varied widely, depending upon the desired concentration and the molecular weight of the olefin. Usually, the concentration of the olefin will vary from about 5 weight percent to about 80 weight percent, more usually from about 20 weight percent to 75 weight percent. The other reactants will be present in the above indicated proportionate amounts.

The order of addition of the reactants to the reaction mixture is not critical. Conveniently, the olefin may be introduced into an inert reaction vessel, either neat or dissolved in a solvent. Hydrocyanic acid and hydrofluoric acid may then be added to the vessel. The vessel is preferably maintained at $0°$ C or lower when the hydrocyanic acid and hydrofluoric acid are introduced, in order to insure complete condensation of the two acids. The alcohol or mercaptan may be added at any time, but should be present when all three reactants are present. That is, the alcohol or mercaptan should be present when the reaction is begun. The above order of addition of the acids and the olefin may be reversed. Alternatively, one or more of the reactants may be added incrementally during the course of the reaction.

Reactants

Any nonconjugated hydrocarbon olefin may be used to supply the hydrocarbyl group for nitrogen substitution. The olefins may be aliphatic, alicyclic, aromatic, terminal or internal, exocyclic or endocyclic, and may have from 0 to 4 hydrocarbon groups bonded to the olefinic carbons. Mono- or polyolefins may be used, the polyolefins being nonconjugated. Except for ethylene, the olefins will have at least one hydrocarbon substituent bonded to an olefinic carbon and preferably, the olefins will have two hydrocarbon substituents bonded to the olefinic carbons, the substituents asymetrically substituted. That is, the preferred olefins are those which, upon addition of a proton to the double bond, provide a tertiary carbonium ion.

Since any nonconjugated olefin may be used, the number of carbon atoms may be varied widely, from low boiling mono-olefins such as ethylene and propylene to high molecular weight polymers which are mono- or polyolefinic. The molecular weight of the olefins may vary from 28 to 500,000, although most olefins which are employed in the process of this invention will be of from about 56 molecular weight (4 carbon atoms) to about 5000 molecular weight. While usually the olefins will have only from one to two sites of olefinic unsaturation, they may have as high as 50 sites of non-conjugated unsaturation. More usually, the olefins will have from about 1 to 6 sites of nonconjugated unsaturation. For certain uses where oil solubility is desired, the olefins will generally vary from 30 to 200 carbon atoms. To prepare fatty amines, the olefins will generally be of from 8 to 30 carbon atoms.

Illustrative olefins include ethylene, propylene, butene-1, butene-2, isobutylene, octene-1 1,5-hexadiene, 1,7-octadiene, decene-1, decene-2, octadecene-1, polypropylene, tripropylene, tetrapropylene, diisobutylene, triisobutylene, tetraisobutylene, polyisobutylene of from about 420 to 5000molecular weight, polyproplene of from about 300 to 5000 molecular weight, allylbenzene, allylnaphthalene, 4-methylpentene-1, eicosene, triacontene, tetracontene, cyclohexene, menthene, octahydronaphthalene, cyclooctene, vinylcyclohexane, methylenecyclopentane, vinylcyclohexene, copolymer of isoprene and styrene, 3-cholestene, etc.

The alcohol and mercaptan are of the general formula RXH, wherein X is a chalcogen of atomic number 8 to 16 (oxygen or sulfur) and R is a hydrocarbon group of from 1 to 300 carbon atoms, usually of from 1 to 60 carbon atoms, and more usually of from 1 to 30 carbon atoms. The carbon atom bonded to X will be bonded solely to carbon and/or hydrogen. With oxygen bonded to an aliphatic carbon atom, the carbon atom bonded to the oxygen must be bonded to at least one hydrogen atom (the alcohol may not be tertiary) and may not be bonded to an aryl group, e.g., benzyl. The alcohol should not form a carbonium ion readily. Except for the above proviso, the substituent on the chalcogen is not critical to the operability of this invention, since it is only the hydrogen and chalcogen which are involved in the reaction. Any hydrocarbon or oxyhydrocarbon substituent may be used depending upon the desired product. The substituent may be aliphatic, alicyclic, aromatic, or combinations thereof, e.g., alkylaryl or aralkyl. The bonding to the chalcogen may be with a primary or secondary carbon atom (with sulfur also a tertiary carbon atom) or with an aromatic carbon atom. The compounds which find use are alcohols, thiols, phenols, and thiophenols. Illustrative compounds include methanol, ethanol, propanol, isopropanol, hexanol, fusel alcohol, octanol, dodecanol, eicosanol, cholesterol, cyclohexanol, cyclopentanol, cyclooctanol, phenol, tert.-butylphenol, cresol, xylenol, naphthol, phenylethanol, methyl thiol, ethyl thiol, thiophenol, thionaphthol, cyclohexane thiol, benzyl thiol, etc.

The alcohols or mercaptans may be used individually or as mixtures. The alcohols or mercaptans should be free of aliphatic unsaturation.

The solvent employed will be an inert solvent which will not participate in the reaction but will solubilize the olefinic reactant. Illustrative solvents include halohydrocarbons such as dichloromethane, chloroform, tetrachloroethylene, chlorobenzene, etc. and nitrated aromatics such as nitrobenzene and nitrotoluene.

The reaction mixture at the completion of the reaction may be worked up simply by allowing the hydrocyanic acid and hydrofluoric acid to vaporize, removing any of the alcohol or mercaptan which has remained and then isolating the desired product. Further purification may be achieved in a variety of ways such as distillation, chromatography, crystallization, extraction, etc.

The product of the reaction will be a N-hydrocarbyl formimidate ester or "formiminoester". The formimidates obtained from mono- and polyolefins will have the following formula:

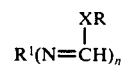

wherein X is chalcogen, $R^1$ is a mono- polyvalent hydrocarbon radical, i.e., hydrocarbyl derived from the nonconjugated olefin, the polyvalence being equal to n, the valence being separated by at least three intervening carbon atoms (—C —C —C —), having from 2 to about 7,150 carbon atoms, more usually from about 2 to 300 carbon atoms and n is an integer of from 1 to 50, more usually an integer from 1 to 10 and preferably an integer of from 1 to 2. $R^1$ has saturated aliphatic carbon atoms bonded to nitrogen. Most frequently, n will be 1.

The monoformimidate esters will have the following formula

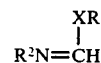

wherein $R^2$ is a monovalent hydrocarbon radical (a hydrocarbyl group derived from the nonconjugated olefin) of from 2 to about 300 carbon atoms, usually from about 4 to 200 carbon atoms and having a saturated aliphatic carbon atom bonded to nitrogen, and X is chalcogen.

The following examples are offered by way of illustration and not by way of limitation. (All reported average molecular weights are viscosity average molecular weights.)

EXAMPLE 1

Into a reaction vessel as described above was introduced 16.8 grams of 2,4,4-trimethylpentene-2, 70cc. of dichloromethane and 4.8 grams of methanol. The reaction mixture was cooled in an ice bath and 15 cc. of hydrogen cyanide and 12 grams of hydrogen fluoride were added. After allowing the mixture to warm to room temperature, the mixture was stirred at room temperature for 16 hours while maintaining the reaction mixture under an ice condenser. All the volatiles were then evaporated by sparing with nitrogen the product diluted with pentane and the pentane then evaporated by sparging with nitrogen.

One-half of the above product was dissolved in ether and 10 grams of diethylamine added. The mixture was stirred at room temperature overnight, followed by heating at 40° C for 2 hours. The solvent was then stripped in vacuo and the product distilled on a spinning band distillation column. A cut was taken boiling at about 43° C at 0.08 mm Hg. Analysis: % N = 12.9. Both the infrared and nuclear magnetic resonance spectra support the product as N,N-diethyl-N'-2,2,4-trimethylpentyl formamidine. (The amidine product further proves the precursor to be the formimidate ester, for formimidates are known to form amidine upon reaction with amines.)

EXAMPLE 2

Into a 5-liter stainless steel flask with a polyethylene condenser was introduced 1,000 grams of polyisobutylene (approximately 2,700 average molecular weight) in 1,900 cc. of dichloromethane, 35.5 grams of methanol, and the solution cooled to 18° C. To the solution was then introduced 79.9 grams of hydrogen cyanide and 118.4 grams of hydrogen fluoride. An ice temperature condenser was maintained while the reaction mixture was allowed to warm to room temperature and the mixture stirred at that temperature for 16 hours. At the end of that time, the volatile materials were removed in vacuo and the residue was diluted with 1,500 ml. of ether. The product was then worked up.

EXAMPLE 3

Into a polyethylene reaction flask fitted with a polyethylene condenser was introduced 68 grams of polyisobutylene (approximately 2,700 average molecular weight), 170 ml. of dichloromethane and 12.7 grams of hexyl alcohol. After cooling the mixture at 18° C, 6.8 grams of hydrogen cyanide and 8 grams of hydrogen fluoride were introduced. The mixture was stirred at room temperatures for 17 hours, at the end of which time solvent and unreacted hydrofluoric acid and hydrocyanic acid were removed by sparging with nitrogen at room temperature and the residue diluted with ether.

The above imidate ester was then separated into two equal parts and one part added with stirring to 11.8 grams of diethylamine in ether, cooled in an ice bath. The mixture was allowed to stir several hours at room temperature and an aliquot isolated and purified by reprecipitation from pentane solution with methanol three times. Analysis: % N = 0.35; molecular weight (Thermonam) 3385.

EXAMPLE 4

Into a reaction vessel as described previously was introduced 150 ml of dichloromethane, 2.4 grams of methanol, the solution cooled to 18° C, and 6 grams of hydrogen fluoride and 5.1 grams of hydrogen cyanide added. To the solution was then added dropwise 51 grams of polyisobutylene (2700 average molecular weight) in 50 ml of dichloromethane and the mixture stirred for a total of 47 hours. At the end of this time, the solvent and unreacted hydrofluoric acid and hydrogen cyanide were evaporated and the residue diluted with ether. The etherial solution was then combined with 10 equivalent weights based on olefin of diethylamine and the mixture allowed to stand for several days. The product was then isolated and purified by reprecipitation for a total of three times from pentane solution with methanol. Analysis: % N = 0.59.

EXAMPLE 5

Into a reaction vessel as described previously, was introduced 43.2 grams of polyisobutylene (approximately 2700 average molecular weight) in 100 ml of dichloromethane, and 7.7 grams of ethyl mercaptan. The solution was cooled to 16° C and 4.2 grams of hydrogen cyanide and 5 grams of hydrogen fluoride introduced. The mixture was allowed to stir at room temperature for 16 hours, at the end of which time volatile materials were evaporated off, leaving the thioimidate ester product.

The thioformimidate obtained above was dissolved in ether and then added to a solution of 10 equivalent weights based on olefin of diethylamine in ether while cooling the solution in an ice bath. After stirring the mixture for 16 hours at room temperature, the product was isolated and purified by reprecipitation for a total of 3 times from a pentane solution with methanol. Analysis: % N = 0.47.

EXAMPLE 6

Into a reaction flask as described previously was introduced 50 ml of dichloromethane, 3 grams of methanol, the solution cooled to 10° C and 8.4 grams of hydrogen cyanide and 10 grams of hydrogen fluoride added. While maintaining the temperature at 10° C a solution of 34.4 grams of polypropylene (approximately 1100 average molecular weight) in 70 ml of dichloromethane was added dropwise. The mixture was allowed to warm to room temperature and stirred for 20 hours.

After evaporating the volatile materials in the reaction mixture, the residue was diluted with ether and 10 equivalent weights of diethyl amine in ether added. The mixture was allowed to stand for 90 hours. Since only very little reaction seemed to have occurred, 30 ml of tetrahydrofuran was added and after standing for 24 hours, 2 ml of water was added. The mixture was allowed to stand for a further 24 hours, at which time 1 ml of concentrated hydrochloric acid was added and the mixture refluxed at 65° C for 70 hours. The product was then isolated and purified by reprecipitation from pentane with methanol for a total of three times. Analysis: % N = 0.93.

EXAMPLE 7

Into a reaction vessel as previously described was introduced 100 grams of propylenetetramer in 100 ml of dichloromethane and 38 grams of methanol and the solution cooled to 10° C. To the cooled solution was added 48 grams of hydrogen cyanide and 40 grams of hydrogen fluoride. After allowing the mixture to warm to room temperature, it was stirred for 8 hours, followed by cooling to 5° C and stirring for an additional 16 hours. The mixture separated into two layers and the clear upper layer was removed. The remaining material was added to 164 grams of diethyl amine in 100 ml of ether at ice bath temperature and the mixture allowed to stand for 16 hours. After filtering the mixture, the filtrate was extracted with pentane and the pentane fraction stripped. The product was then isolated. Analysis: % N = 9.27–9.28.

EXAMPLE 8

Into a reaction vessel as described previously was introduced 14 grams of 2,4,4-trimethylpentene-2 in 70 ml dichloromethane and the solution cooled to below 5° C. To the cooled solution was added 9 grams of methyl mercaptan, 9 grams of hydrogen cyanide and 10 grams of hydrogen fluoride. The mixture was allowed to stir overnight at room temperature, after which time the volatile materials were evaporated by sparging with nitrogen. Pentane was added and evaporation repeated. After diluting the residue with dichloromethane, 50 grams of triethylamine was added and the mixture allowed to stir for 1 hour. After this time, the mixture was filtered and the filtrate isolated and volatile materials removed. The residue was 17.03 grams of the thioformimidate as evidenced by its infrared spectrum.

Solvolysis

The N-hydrocarbyl formimidate esters and thioformimidate esters can be used directly as lubricating oil dispersant additives, or can be easily reacted with water, hydrogen sulfide, alcohols, mercaptans and amines to yield a variety of useful products, P. A. S. Smith, Open-Chain Nitrogen Compounds, Vol. I, page 171f, W. A. Benjamin, New York. For example, the imidates hydrolyze readily in the presence of dilute acid to form N-hydrocarbyl primary amines.

The imidates can be subjected to aminolysis to form amidines. In the aminolysis the amine reactants will normally be primary or secondary amines of from 1 to 60 carbon atoms, more usually of from 1 to 24 carbon atoms. Polyamines may also be used having from 2 to 10 amine nitrogen atoms, more usually 2 to 6 amine nitrogen atoms. Particularly desirable polyamines are the alkylene polyamines, such as the polyethylene polyamines, e.g., ethylene diamine, triethylene tetramine, both alkylated and unalkylated. The amines may be aliphatic, alicyclic, aromatic or heterocyclic, having nitrogen or oxygen as their only annular hetero atoms. Illustrative amines include methylamine, diethylamine, stearylamine, cholesterylamine, abietylamine, aniline, benzylamine, tetraethylenepentamine, piperazine, morpholine, N,N'-diethyl ethylenediamine, N-octadecylpropylenediamine, N-oleyl ethylenediamine, etc.

The reaction with the amines is carried out neat or in an inert solvent. The amine will be present in from 1 to 80 mols per mol of formimidate ester. The temperature may vary from about $-10°$ to $100°$ C. The preparation of amines and amidines from imidates is known and does not require extensive discussion here.

Solvolysis reactions of the imidates can be carried out in several combinations by using bifunctional compounds such as mercapto-amines, amino-alcohols, etc.

As is evident from the aforementioned examples, the process of this invention can be used to provide a variety of compounds having a variety of uses. The imidates may be hydrolyzed to amines such as ethylamine, butylamine, diisobutylamine, polyisobutenylamine, polypropenylamine, etc. These amines can be used as detergents and dispersants in a variety of media depending on their molecular weight. Long chain monoamines can be used as fuel or lubricating oil detergents or as precursors to such compounds. The aryl imidates can be used to form alkylaryl amines by thermally rearranging them according to the Chapman rearrangement. These amines are frequently only difficultly obtainable by alternative methods. The imidate esters may also be used to form the strongly basic amidines which can be used as an oil soluble source of base to neutralize acids which may form under conditions of lubrication.

The process of this invention, therefore, forms a simple direct method for introducing various nitrogen functionalities into a hydrocarbon so as to functionalize the hydrocarbon for a variety of uses. The reactants can be easily separated from the product and high yields of a relatively pure product obtained.

I claim:

1. A method for preparing a primary amine in the form of a formimidate ester or thioformimidate ester, wherein the amine nitrogen is bonded to a saturated aliphatic carbon atom which comprises reacting a non-conjugated hydrocarbon olefin having a molecular weight of 28-500,000 and containing 1-50 sites of olefinic unsaturation with hydrogen fluoride and hydrocyanic acid in the presence of an alcohol mercaptan of the formula R—XH wherein X represents oxygen or sulfur and R represents a hydrocarbyl of 1-300 carbon atoms at a temperature of from about $-10°$ to about $100°$ C wherein the mol ratio of hydrocyanic acid to said olefin is in the range of about 0.5-20:1, the mol ratio of said alcohol or said mercaptan to said olefin is in the range of about 0.9-10:1, and the mol ratio of hydrogen fluoride to hydrocyanic acid is in the range of about 1-10:1.

2. A method according to claim 1 wherein the mol ratio of hydrocyanic acid to olefin is in the range of about 3-10:1, the mol ratio of alcohol or mercaptan to olefin is in the range of about 1-5:1 and the mol of hydrogen fluoride to hydrocyanic acid is in the range of 1.5-5:1.

3. A method according to claim 1 wherein said non-conjugated olefin is an aliphatic hydrocarbon and from 8 to 30 carbon atoms.

4. A method according to claim 3 wherein said non-conjugated olefin is of from 30 to 300 carbon atoms.

5. A method according to claim 4 wherein said olefin is polyisobutylene.

6. A method according to claim 1 wherein said alcohol is methanol.

7. A method according to claim 1 wherein the reaction is carried out in the presence of an inert solvent and the concentration of the olefin is of from 5-80 weight percent.

8. A N-hydrocarbyl formimidate ester or thioformimidate ester wherein said hydrocarbyl group contains from 30 to 300 carbon atoms and is derived from a non-conjugated olefin.

* * * * *